United States Patent [19]  
Harmer

[11] 4,273,912  
[45] Jun. 16, 1981

[54] POLYURETHANE FLOOR VARNISH AND FLOOR MATERIALS COATED THEREWITH

[75] Inventor: Walter L. Harmer, Arden Hills, Minn.

[73] Assignee: Minnesota Mining and Manufacturing Company, Saint Paul, Minn.

[21] Appl. No.: 78,463

[22] Filed: Sep. 24, 1979

[51] Int. Cl.$^3$ .............. C08G 18/32; C08G 18/72; B32B 27/40

[52] U.S. Cl. ................ 528/67; 428/423.1; 428/423.3; 428/424.8; 428/425.8; 528/59; 528/66

[58] Field of Search ................ 528/59, 66, 67

[56] References Cited

U.S. PATENT DOCUMENTS

| | | | |
|---|---|---|---|
| 3,454,533 | 7/1969 | Kerrigan et al. | 528/59 |
| 3,652,506 | 3/1972 | Gibier-Rambaud et al. | 528/59 |
| 3,652,508 | 3/1972 | Segur et al. | 528/59 |
| 3,705,879 | 12/1972 | Brizgys | 528/67 |
| 3,706,710 | 12/1972 | Camilleri et al. | 528/67 |
| 3,792,023 | 2/1974 | Havenith et al. | 528/66 |
| 4,018,745 | 4/1977 | Peterson | 260/77.5 AT |
| 4,038,239 | 7/1977 | Coyner et al. | 528/67 |
| 4,103,056 | 7/1978 | Baratto et al. | 428/142 |
| 4,125,545 | 11/1978 | Kroplinski et al. | 528/67 |

Primary Examiner—H. S. Cockeram  
Attorney, Agent, or Firm—Cruzan Alexander; Donald M. Sell; Richard Francis

[57] ABSTRACT

A tough, wear-resistant polyurethane coating composition particularly suited for providing a protective coating on an elastomeric flooring is provided by the moisture-cured reaction product of an organic isocyanate-terminated prepolymer produced by reacting a diol component comprising at least one diol having a weighted average molecular weight between about 500 and 1200 and two primary hydroxyl groups, sufficient diisocyanate compound having two terminal isocyanate groups and sufficient compatible catalyst to facilitate the cure of the prepolymer. The invention also includes a floor covering material having a traffic surface coated with the coating composition.

14 Claims, No Drawings

POLYURETHANE FLOOR VARNISH AND FLOOR MATERIALS COATED THEREWITH

BACKGROUND OF THE INVENTION

1. Field of the Invention

This invention relates to a tough, wear-resistant polyurethane varnish and flooring materials coated therewith.

2. Prior Art

The need for a protective surface coating on rigid flooring materials has long been present. A coating is necessary, not only to prevent undue wear of the surface being protected, but also to seal the surface against external influences such as moisture, light and corrosive elements in the atmosphere. Such surface coating materials are commonly liquid applications solidifying soon afterwards. Early surface coating materials included oils, wax, egg albumin, and glue. The first floor varnishes were solutions of natural resins, characterized by transparency, hardness, amorphous (not crystalline) structure, and virtually no long-lasting integrity. They developed cracks on aging, even when used indoors.

Present day protective coatings are now mainly synthetic resins which are generally not subject to variation in availability or quality as were their natural predecessors. Polyurethane coatings, first developed in Germany, have found wide commercial acceptance as coating compositions. These materials possess a desirable combination of flexibility, toughness, abrasion and chemical resistance. They could be formulated as clear varnishes and cured either at room temperature or elevated temperatures. (The meaning of the term "varnish" as used herein is in the general sense as any liquid preparation or composition which may be applied to a substrate to dry to provide a protective coating.)

In the late 1950s, one-component, moisture-curable polyurethane coatings were developed. These compositions were based on reaction of water vapor with a stable isocyanate-terminated prepolymer formed of isocyanate, mainly toluene diisocyanate, and a polyfunctional polyether.

A need has developed for a high performance, highly abrasion-resistant and chemically-resistant, transparent, substantially non-yellowing, polyurethane composition which may be applied to elastomeric floor covering materials such as those having a decorative surface which may be textured. A floor covering material of this type is disclosed in assignee's U.S. Pat. No. 4,103,056 as being a resilient wood replication formed of a thick elastomeric polyurethane base having a wood-stained molded textured wood-grain surface which is overcoated with a clear, tough, abrasion-resistant, flexible, water-resistant polyurethane protective coating.

The protective coating of such a floor covering material must be sufficiently resilient to retain its integrity even when stressed, for example, by the imposition of a narrow high heel of a woman's shoe or the end of a small cross sectional area leg of a heavy piece of furniture. Additionally, the coating composition must also provide sufficient wear resistance and chemical resistance to provide long-term use under pedestrian and other traffic without failure. Also important is the requirement that the protective coating remain substantially clear, without yellowing, particularly where the floor covering material is light-colored.

SUMMARY OF THE INVENTION

It has been discovered that a tough, wear-resistant polyurethane coating composition which is particularly suited for providing a protective coating on an elastomeric flooring material is provided by a moisture-curable organic isocyanate-terminated prepolymer. The prepolymer is prepared by reacting a diol component comprising at least one diol having two primary hydroxyl groups and a weighted average molecular weight between about 500 and about 1200, preferably 650 to 800, and sufficient diisocyanate compound having two terminal isocyanate groups to provide an NCO-:OH equivalent ratio of about 1.4:1 to about 2.1:1, preferably 1:5 to 2.0:1, in the presence of a suitable catalyst, to produce a tough, flexible abrasion-resistant protective coating. The concentration of urethane groups in the prepolymers is approximately the same within this weighted average molecular weight range. Similarly, the concentration of urea groups in the cured polymer made from such prepolymers is approximately the same within this weighted average molecular weight range. Coating compositions having less diisocyanate than the lower amount defined above are generally undesirably viscous therefore difficult to coat. Coating compositions having more diisocyanate than that defined above will contain unreacted diisocyanate which may present a toxicity problem.

While virtually any diisocyanate compound may be employed, keeping in mind that certain diisocyanate compounds are more toxic than others, a mixture of aromatic diisocyanate and aliphatic diisocyanate is preferred, with greater amounts of aliphatic diisocyanate being preferred for lighter-colored substrates being coated. Coatings containing mainly aromatic diisocyanates have a tendency to yellow upon aging.

The selection of the diol component is an important aspect of the present invention. The diol may be a mixture of a polymeric diol and a low molecular weight diol, for example having from 2 to 20 carbon atoms, preferably 2 to 10 carbon atoms, or may be a polymeric diol having a molecular weight of up to about 1200, preferably no greater than about 800. The diol component is characterized by being a difunctional organic compound having the general formula HO—CH$_2$—R—CH$_2$—OH wherein R is a divalent organic radical. Examples of unsuitable diols not having two primary hydroxyl groups include polypropylene glycol and polyepichlorohydrin diol.

Applicant has discovered that coating compositions produced with diols not containing primary hydroxyl groups will have an undesirably low wear resistance. The same is true for coating compositions which are produced with triols instead of diols. The triol-containing compositions are more highly cross-linked and have been found to wear poorly.

Prepolymers containing diols having a weighted average molecular weight greater than about 2000 have a poor abrasion resistance and are therefore undesirable. Preferred coating compositions according to the present invention have excellent abrasion resistance characterized by having a Taber Abraser Value of less than 12, preferably less than 10 (average weight loss in milligrams per 1000 cycles using an H-18 wheel under a 500 g load).

Diol employed in the coating compositions of the present invention have a weighted average molecular weight in the range of about 500 to 1200, preferably 650 to 800. That is, if a single diol is employed, it has a molecular weight in this range.

It is to be understood that a mixture comprising more than one diol may be employed in producing the coating composition of the invention. For example, the coating composition may comprise a low molecular weight diol, i.e., a $C_2$-$C_{20}$ diol such as 1,4-butane diol, and a higher molecular weight diol such as polytetramethylene glycol having a molecular weight of 1000. The weighted average molecular weight of the diols in such a mixture should be within the range of about 500 to 1200, as described above.

The weighted average molecular weight of 2 diols in a diol component may be calculated by the formula $$\overline{M}_w = \left(\frac{M_1}{M_1} + M_2\right) MW_1 + \left(\frac{M_2}{M_1} + M_2\right) MW_2$$

where $M_w$ is the weighted average molecular weight, $M_1$ is the number of moles of the first diol, $M_2$ is the number of moles of the second diol, $MW_1$ is the molecular weight of the first diol and $MW_2$ is the molecular weight of the second diol. The weighted average molecular weight of a diol component which comprises "n" diols may be calculated by the formula $$\overline{M}_w = \sum_{i=1}^{n} \frac{M_i}{m} MW_i$$

where m is the sum of the moles of diol $$\sum_{i=1}^{n} M_i,$$

$M_i$ is the number of moles of each diol and $MW_i$ is the molecular weight of each diol.

DETAILED DESCRIPTION

The preferred diisocyanate compounds useful in the coating compositions of the present invention include alphatic and/or aromatic diisocyanates. Examplary diisocyanates that may be used include ethylene diisocyanate, propylene-1,2-diisocyanate, butylene-1,4-diisocyanate, hexylene-1,6-diisocyanate, cyclohexylene-1,2-diisocyanate, 1,3-phenylene diisocyanate, toluene-2,4-diisocyanate, toluene-2,6-diisocyanate, mixtures of toluene-2,4-diisocyanate and toluene-2,6-diisocyanate, diphenyl-3,3'-dimethyl-4,4'-diisocyanate, diphenyl-3,3'-dimethoxy-4,4'-diisocyanate, diphenyl methane-4,4'-dimethyl-3,3'-diisocyanate, dicyclohexylmethane 4,4'-dimethyl-3,3'-diisocyanate, 1,5-naphthylene diisocyanate, methylene bis(4,4'-cyclohexyl isocyanate) and methylene bis(4,4'-phenyl isocyanate).

Useful lower molecular weight diols include ethylene glycol, diethylene glycol, 1,4-butane diol, 1,6-hexane diol, and 1,10-decane diol. Useful polymeric diols include polycaprolactone diol, e.g., that having a molecular weight of 530 and being sold under the trade designation "PCP 0200" by Union Carbide, polytetramethylene glycol, e.g., that having a molecular weight of 1000 and being sold under the trade designation "Polymeg" 1000, and polyethylene ether glycol, e.g., that sold under the trade designation "Carbowax" 1000.

The preferred coating compositions of the present invention comprise a diol component comprising a major portion of polymeric diol and a minor portion of short chain diol having from 2 to 10 carbon atoms. The most preferred diol component comprises a major portion of polytetramethylene glycol and a minor portion of 1,4-butane diol.

Certain prepolymer compositions may require viscosity adjustment to make them more acceptable for coating. For coating purposes, it is preferred that the viscosity be within the range of 100 to 10,000 cps, preferably 500 to 1,000 cps, to provide a coating composition which spreads adequately over the surface of a substrate being coated. More viscous compositions may be made less viscous by the addition of compatible solvents. In the practice of the invention, the prepolymer is prepared in a suitable solvent, e.g., "Cellosolve" acetate, xylene, toluene, methyl isobutyl ketone, to a solids content of approximately 10% to 50%, including fillers and other additives.

While most coating compositions cure in the presence of moisture which is present in the surrounding atmosphere, more rapid curing in a commercially acceptable period of time is facilitated by the addition of a suitable catalyst or curing accelerator. Examples of such catalysts include dialkyl tin salt of carboxylic acids such as dibutyl tin dilaurate, triethylene diamine and other catalysts known for this purpose.

Other additives such as those known in the coating art may be employed to obtain various benefits. For example, flattening agents such as fumed silicas, e.g., that sold under the trade designation "Degussa" TS-100 or "Cab-O-Sil" may be added. Ultraviolet light absorbers may also be included.

EXAMPLES

The invention is illustrated by the following examples.

A coating composition according to the invention was prepared of the ingredients identified below as "initial mixture". After drying the silica, diols and solvents, the diisocyanates were added. The resultant mixture was then heated to about 80° C. for approximately 2 hours, the catalyst was added, and the resultant mixture maintained at 80° C. for an additional 2 hours. The resultant liquid had a viscosity of around 1600 centipoise at room temperature and an NCO number of approximately 2,200. This prepolymer solution was then mixed with the ingredients identified as "pre-use mixture" and the resultant mixture was curtain coated to provide approximately 100 microns thick dry coating on a floor surfacing material formed of a polyurethane elastomer having a textured wood-grain stained surface. The coating composition was cured and measured for wearability with a Taber Abraser using an H-18 wheel with 500 gram load. The Taber wear factor was 5.6 milligrams per 1000 cycles.

EXAMPLE 1

| Initial Mixture | |
|---|---|
| Ingredient | Parts by Weight |
| Polytetramethylene glycol having a molecular weight of approximately 1000 (solid) | 250.0 |
| 1,4-butane diol (liquid) | 6.6 |
| Methyl isobutyl ketone (solvent) | 294.4 |
| Toluene (solvent) | 285.0 |
| Fumed silica flattening agent sold under the trade designation "Degussa" TS-100 (solid) | 25.0 |
| Methylene bis(4,4'-cyclohexyl isocyanate) (solid) | 36.0 |
| Methylene bis(4,4'-phenyl isocyanate) (solid) | 103.0 |

| -continued | |
|---|---|
| Dibutyl tin dilaurate (catalyst) | 0.06 |

| Pre-Use Mixture | |
|---|---|
| Ingredient | Parts by Weight |
| "Cellosolve" acetate (solvent) | 75.8 |
| Catalyst solution A (10% by weight dibutyl tin dilaurate in "Cellosolve" acetate) | 9.5 |
| Catalyst Solution B (10% by weight triethylene diamine in 1:1 by weight methyl isobutyl ketone:"Cellosolve" acetate | 2.0 |
| UV absorber solution (14% hindered secondary acrylic diamine sold under the trade designation "Tinuvin" 770 in 1:1 by weight toluene: "Cellosolve" acetate) | 21.9 |

EXAMPLES 2-27

Other compositions were prepared, some according to the present invention and some outside the scope of the claims for purposes of comparison. These examples are shown in Table I below. Examples 2-27 were prepared in the same manner as Example 1 except with the ingredient adjustment shown in the table. Examples 2-27 did not contain the flattening agents shown in Example 1. Additionally, the compositions of Examples 2-12, 14-15, and 17-23 contained 75% methylene bis(4,4'-phenyl isocyanate) and 25% methylene bis(4,4'-cyclohexyl isocyanate). The diisocyanate of Example 13 consisted of 25% hexamethylene diisocyanate and 75% methylene bis(4,4'-phenyl isocyanate). The diisocyanate of Example 16 was 100% methylene bis(4,4'-cyclohexyl isocyanate) and Examples 24-27 contained 100% methylene bis(4,4'-phenyl isocyanate).

The compositions were coated on the unstained textured surface of a polyurethane floor surfacing material and the cured coatings tested for abrasion resistance with the Taber Abraser. The Taber Abraser test was run for five 1000 cycle runs on each coating, with the sample being reweighed after every 1000 cycles. The average for the 1000 cycle runs is reported in the Table. If the sample showed excessive wear before the completion of 5000 cycles, the test was discontinued and the number of cycles noted. Note that Examples, 3, 8, 10, 11, 22, 24 and 25, outside the scope of the claims, are characterized by having marginal or poor Taber Abraser values. The coating compositions of Examples 3, 8, 10 and 22 contain diols not having primary hydroxyl groups. The compositions of Examples 11, 24 and 25 contain triols.

In Table I:

PTMG-1000 is polytetramethylene glycol having a molecular weight of about 1000 sold under the trade designation Polymeg 1000;

PPG 1025 is polypropylene glycol having a molecular weight of about 1000;

PCP 0230 is polycaprolactone diol having a molecular weight of about 1250;

PECH is polyepichlorohydrin diol having a molecular weight of about 940;

PTMG 650 is polytetramethylene glycol having a molecular weight of about 650;

PCP 0200 is polycaprolactone diol having a molecular weight of about 530;

PPG 425 is polypropylene glycol having a molecular weight of about 425;

PCP 0240 is polycaprolactone diol having a molecular weight of 2000; and

TP-440 is a triol consisting of a polypropylene oxide adduct of glycerol having a molecular weight of 440.

TABLE I

| Ex. No. | Diol Component | | | $\bar{M}_w$ | NCO:OH | Modulus at 100% El. (psi) | Tensile at break (psi) | Elongation at break (%) | Taber wear factor* | Taber cycles run |
|---|---|---|---|---|---|---|---|---|---|---|
| | Polymeric | $C_2$-$C_{20}$ | Polymeric: $C_2$-$C_{20}$ | | | | | | | |
| 2 | PTMG-1000 | — | 1:0 | 1,000 | 1.74:1 | 326 | 3,129 | 518 | 7.8 | 5,000 |
| 3 | PPG-1025 | 1,4-butane diol | 3.14:1 | 780 | " | 391 | 2,825 | 357 | 70.3 | 2,000 |
| 4 | PCP-0230 | 1,4-butane diol | " | 970 | " | 378 | 4,251 | 545 | 7.5 | 5,000 |
| 5 | PTMG-1000 | 1,4-butane diol | " | 780 | 1.90:1 | 985 | 4,491 | 485 | 5.9 | 5,000 |
| 6 | " | 1,4-butane diol | " | 780 | 1.50:1 | (weak and sticky) | | | 331.7 | 860 |
| 7 | PTMG-1000 | ethylene glycol | " | 773 | 1.74:1 | 509 | 2,882 | 472 | 6.8 | 5,000 |
| 8 | " | dipropylene glycol | " | 790 | " | 436 | 3,772 | 449 | 14.5 | 2,317 |
| 9 | " | N-methyl diethanol amine | " | 787 | " | 929 | 5,269 | 418 | 7.0 | 5,000 |
| 10 | PECH | 1,4-butane diol | " | 735 | " | (brittle) | | | 84.0 | 2,659 |
| 11 | PTMG-1000 | 50% TP-440 triol 50% 1,4-butane diol | " | 822 | " | 639 | 5,310 | 381 | 11.4 | 5,000 |
| 12 | " | 1,10-decane diol | " | 800 | " | 561 | 5,152 | 417 | 5.4 | 5,000 |
| 13 | " | 1,4-butane diol | " | 780 | " | 653 | 5,602 | 515 | 8.5 | 5,000 |
| 14 | PTMG-650 | — | 1:0 | 650 | 1.4:1 | 306 | 3,080 | 470 | 5.1 | 5,000 |
| 15 | PTMG-1000 | 1,4-butane diol | 3.14:1 | 780 | 2.1:1 | 1,239 | 6,011 | 338 | 10.7 | 5,000 |
| 16 | " | 1,4-butane diol | " | 780 | 1.74:1 | 1,024 | 5,112 | 334 | 7.2 | 5,000 |
| 17 | PTMG-1000 | bis-hydroxyethyl resorcinol | " | 806 | 1.74:1 | 1,179 | 3,539 | 277 | 39.9 | 3,000 |
| 18 | PTMG-650 | 1,4-butane diol | " | 515 | " | 2,230 | 6,297 | 271 | 20.3 | 581 |
| 19 | " | none | 1:0 | 650 | " | 1,276 | 6,746 | 377 | 4.0 | 5,000 |
| 20 | PCP-0200 | 1,4-butane diol | 3.14:1 | 424 | " | 3,594 | 5,717 | 176 | 10.4 | 5,000 |
| 21 | " | none | 1:0 | 530 | " | 1,355 | 5,159 | 295 | 8.0 | 5,000 |
| 22 | PPG-425 | 1,4-butane diol | 3.14:1 | 344 | " | — | 3,930 | 75 | 59.4 | 5,000 |
| 23 | PCP-0240 | 1,4-butane diol | 1.57:1 | 1,257 | " | 226 | 3,624 | 697 | 8.4 | 1,000 |
| 24 | PTMG-1000 | TP-440 | 3.14:1 | 898 | " | 988 | 4,276 | 409 | 11.6 | 5,000 |
| 25 | " | " | 1.57:1 | 782 | " | 991 | 3,156 | 279 | 50.0 | 1,000 |
| 26 | " | 1,4-butane diol | 3.14:1 | 780 | " | 886 | 3,208 | 548 | 4.6 | 5,000 |
| 27 | " | 1,4-butane diol | 1.57:1 | 646 | " | 1,803 | 5,616 | 576 | 8.4 | 5,000 |

*average mg/1000 cycles

While the use of the coating composition of the present invention has been mainly described as being for protection of flooring materials such as an elastomeric textured-surfacing flooring material, it is also useful as a protective coating for other substrates. For example, it has been used successfully as a protective coating on textured sheet materials, as a protective coating on the backside of coated abrasive flaps of an abrasive flap wheel, on bright metal surfaces such as a nickel surface, on polymeric films such as a polyimide film, on polystyrene substrates, on the interior or exterior surface of a metal can, on unpainted surfaces and on stained or unstained wood. Other uses of the protective coating are also contemplated.

What is claimed is:

1. A tough, wear-resistant polyurethane coating composition particularly suited for providing a protective coating on an elastomeric flooring material, said composition consisting essentially of the moisture-cured reaction product of an organic isocyanate-terminated prepolymer produced by reacting
   (a) a diol component having a weighted average molecular weight between about 500 and 1200 and two primary hydroxyl groups; and
   (b) sufficient diisocyanate compound having two terminal isocyanate groups to provide an NCO:OH equivalent ratio of about 1.4:1 to 2.1:1; said reacting being accomplished in the presence of sufficient compatible catalyst to facilitate the cure of said composition in a commercially acceptable period of time, said protective coating being characterized by having a Taber abraser value less than 10 milligrams average weight loss per 1000 cycles using an H-18 wheel under a 500 g load.

2. The coating composition of claim 1 wherein said diol component is a mixture of $C_2$–$C_{20}$ diol and polymeric diol.

3. The coating composition of claim 1 wherein said diol component has a weighted average molecular weight in the range of about 650 to about 800.

4. The coating composition of claim 1 wherein said diol component is a mixture comprising a major portion of polytetramethylene glycol and a minor portion of 1,4-butane diol.

5. The coating composition of claim 1 wherein said diisocyanate compound is a mixture comprising a major portion of aromatic diisocyanate and a minor portion of aliphatic diisocyanate.

6. The coating composition of claim 5 wherein said aromatic diisocyanate is methylene bis(4,4'-phenyl isocyanate) and said aliphatic diisocyanate is methylene bis(4,4'-cyclohexylisocyanate).

7. An article comprising a substrate coated with a cured coating comprising the coating composition of claim 1.

8. A floor material comprising a member having a traffic surface coated with a tough, wear-resistant polyurethane coating composition consisting essentially of the moisture-cured reaction product of an organic diisocyanate-terminated prepolymer produced by reacting in the presence of a suitable catalyst
   (a) a diol component having a weighted average molecular weight between about 500 and 1200 and two primary hydroxyl groups; and
   (b) sufficient diisocyanate compound having two terminal isocyanate groups to provide an NCO:OH equivalent ratio of about 1.4:1 to 2.1:1, said protective coating being characterized by having a Taber abraser value less than 10 milligrams average weight loss per 1000 cycles using an H-18 wheel under a 500 g load.

9. The floor material of claim 8 wherein said member is a sheet of elastomeric material.

10. The floor material of claim 8 wherein said diol component is a mixture of $C_2$–$C_{20}$ diol and polymeric diol.

11. The floor material of claim 8 wherein said diol component has a weighted average molecular weight in the range of about 650 to about 800.

12. The floor material of claim 8 wherein said diol is a mixture comprising a major portion of polytetramethylene glycol and a minor portion of 1,4-butane diol.

13. The floor material of claim 8 wherein said diisocyanate is a mixture comprising a major portion of aromatic diisocyanate and a minor portion of aliphatic diisocyanate.

14. The floor material of claim 13 wherein said aromatic diisocyanate is methylene bis(4,4'-phenyl isocyanate) and said aliphatic diisocyanate is methylene bis(4,4'-cyclohexylisocyanate).

* * * * *